March 28, 1967
D. E. CLELAND
3,311,176
SPINNER PLOW
Filed April 28, 1964
5 Sheets-Sheet 1
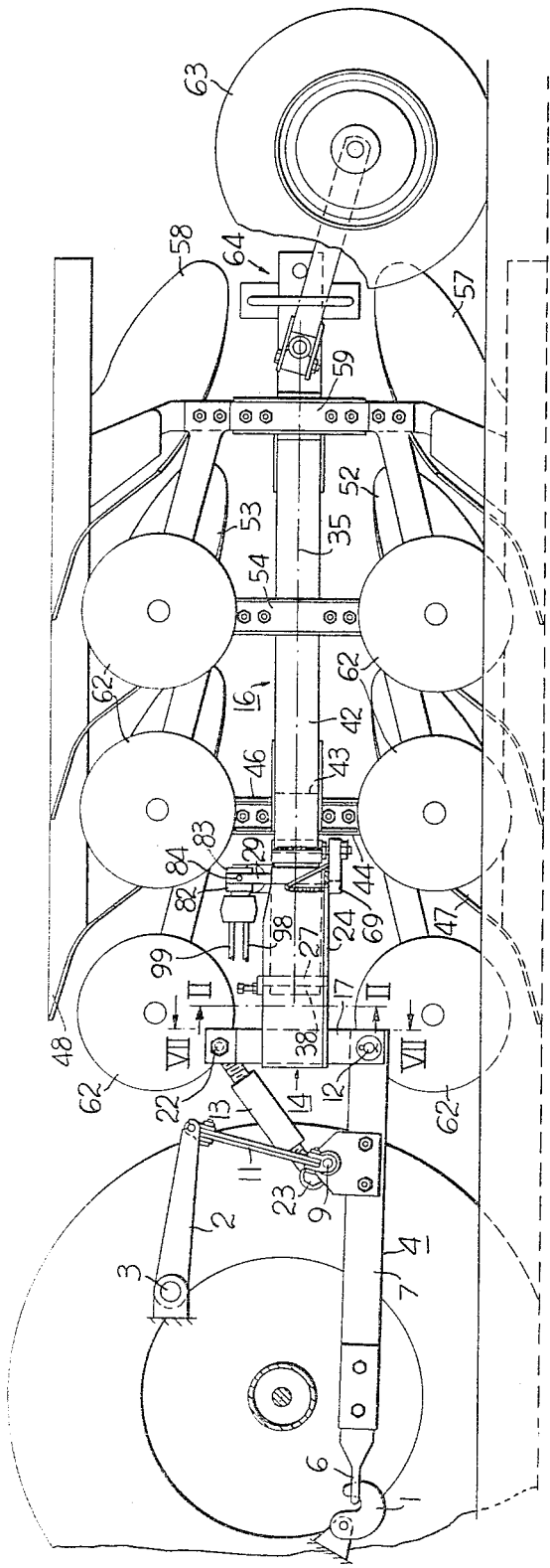
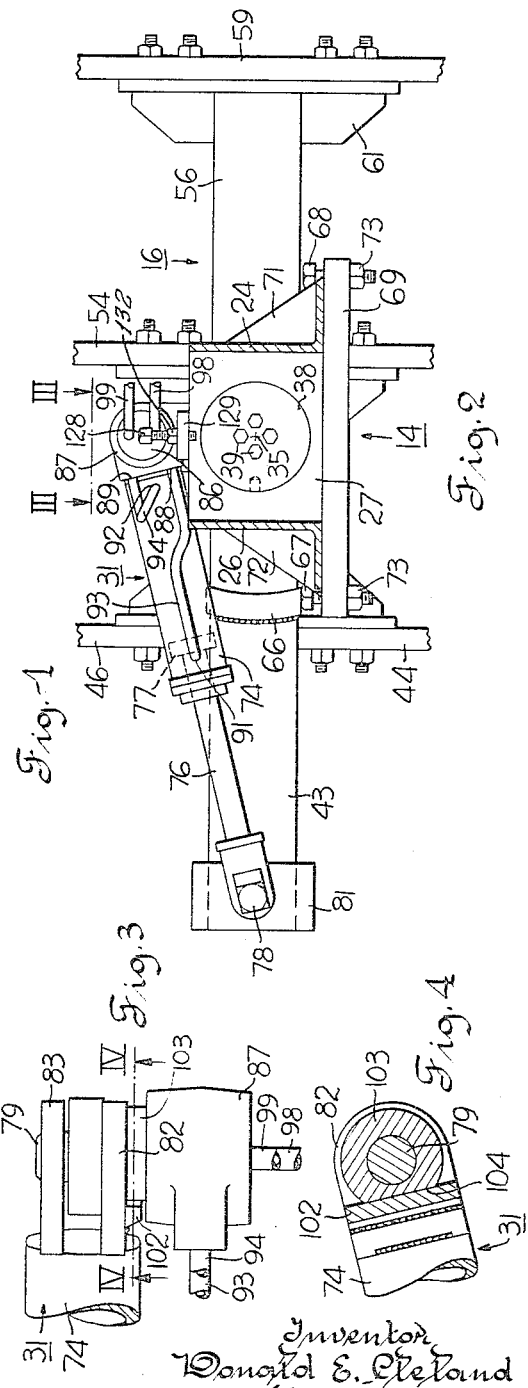
Inventor
Donald E. Cleland
By W. Nicols
Attorney

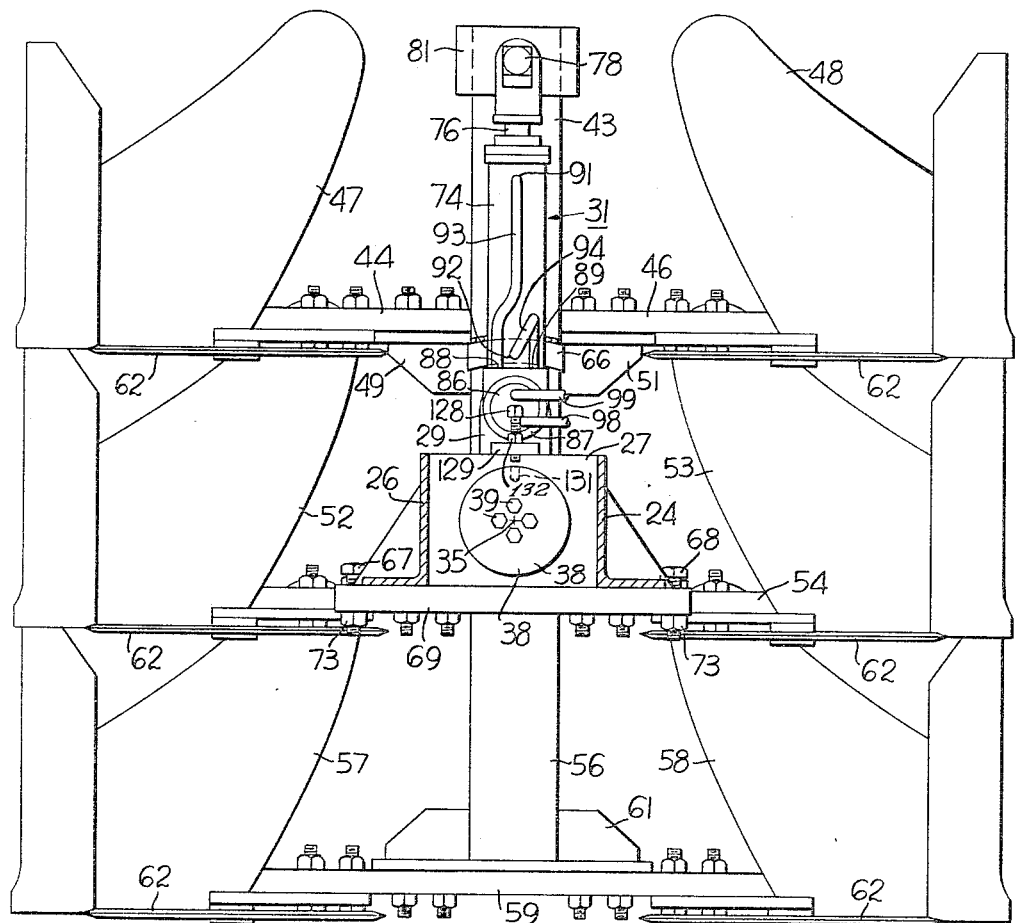
Fig. 5
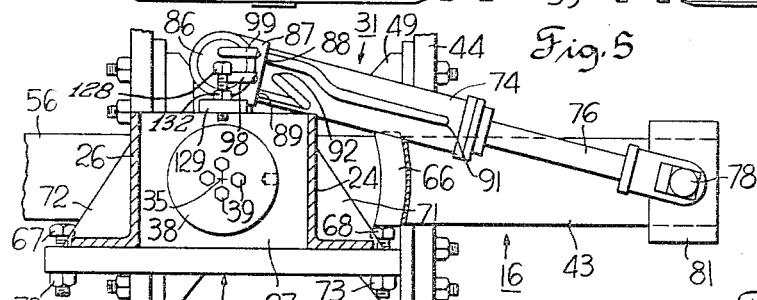
Fig. 6
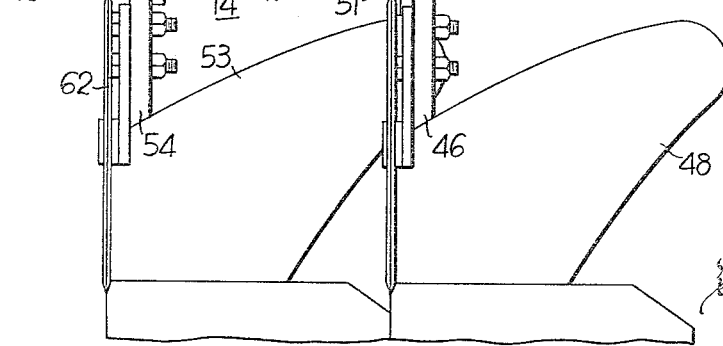
Inventor
Donald E. Cleland
By
Attorney

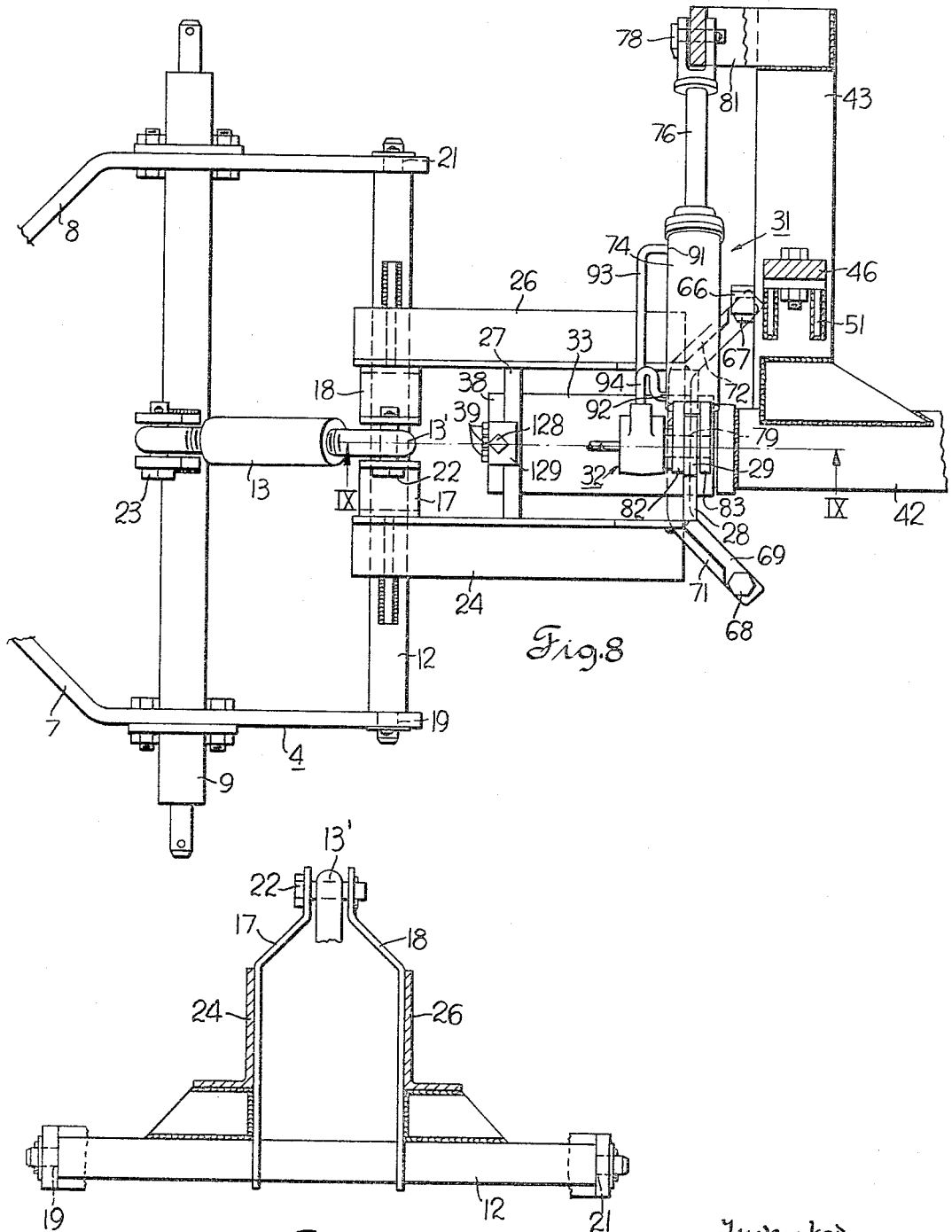

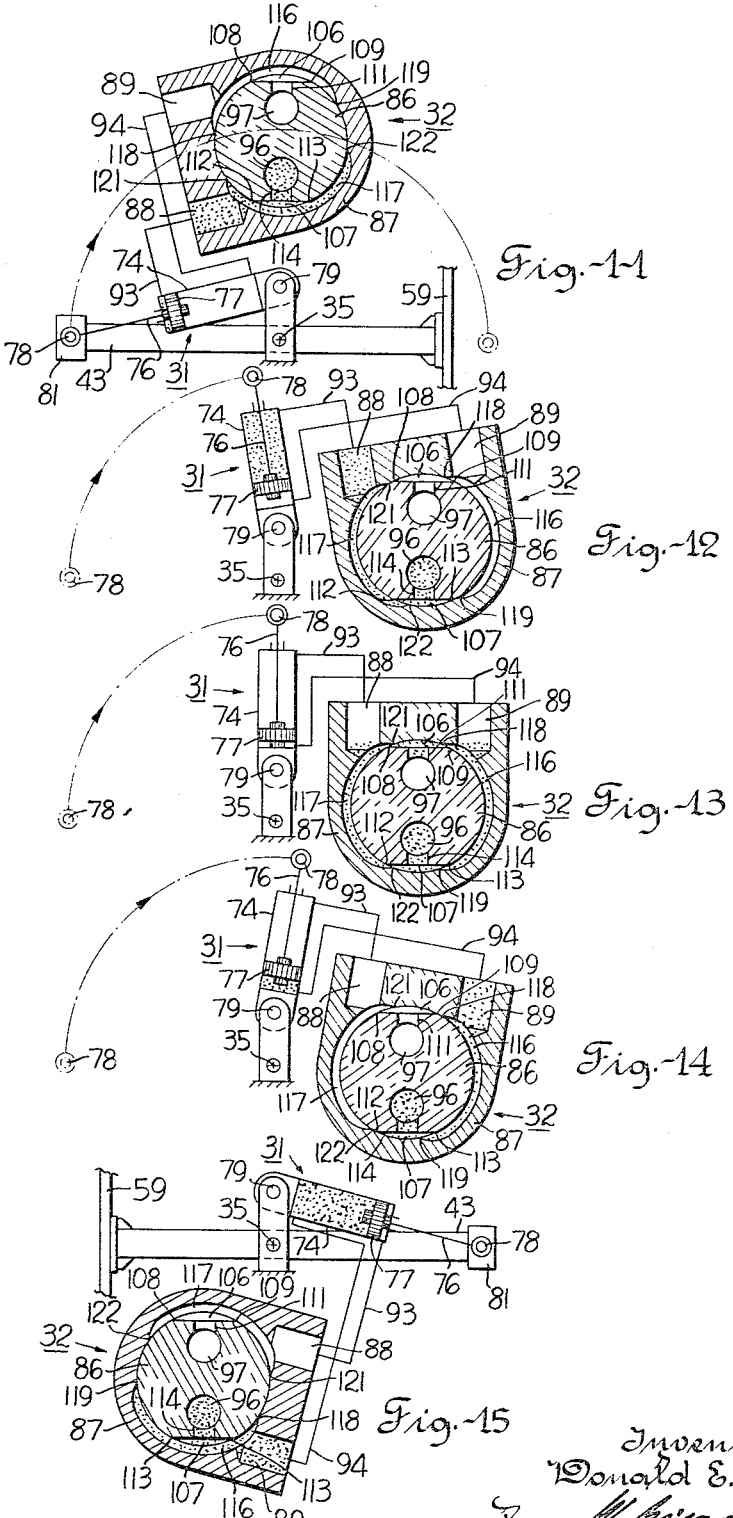

United States Patent Office 3,311,176
Patented Mar. 28, 1967

3,311,176
SPINNER PLOW
Donald E. Cleland, Milwaukee, Wis., assignor to Allis-Chalmers Manufacturing Company, Milwaukee, Wis.
Filed Apr. 28, 1964, Ser. No. 363,185
8 Claims. (Cl. 172—225)

The invention relates to two-way plows. More particularly, the invention is concerned with a two-way plow of the spinner type wherein a support and a roll-over frame mounting right and left-hand plow bottoms are pivotally interconnected on a longitudinal turning axis, and wherein the roll-over frame is rotated alternately in opposite directions to present it in one operative position for right-hand plowing and in another operative position for left-hand plowing.

Various types of mechanisms have heretofore been suggested for turning the roll-over frame and associated plow bottoms of a spinner plow back and forth between predetermined plowing positions. Such mechanisms as heretofore known, however, are believed to have not been entirely satisfactory, particularly in the matter of simplicity of design and economy of production costs.

The principal object of the present invention is to provide an improved spinner plow incorporating an extremely simple hydraulically powered turning mechanism for the roll-over frame, which is rugged and compact in construction, efficient in operation, and which lends itself to manufacture at relatively low costs.

More specifically, it is an object of the invention to provide an improved turning mechanism for spinner plows which uses a hydraulic ram, and which makes such ram do as much work as a ram having a stroke twice as long, by using both the contracting and expanding strokes on one full roll-over movement of the plow frame and associated plow bottoms.

Another object of the invention is to provide an improved two-way plow of the mentioned character, wherein the hydraulic ram has its greatest leverage at each end of the roll-over movement where the plow moment is the greatest, and wherein the hydraulic ram has a minimum leverage at the midpart of the roll-over movement where the rotary frame and plow bottom assembly is balanced.

A further object of the invention is to provide an improved two-way plow of the mentioned character wherein the rotary frame and plow bottom assembly is accelerated during the first part and decelerated during the second part of its roll-over movement, the angular velocity of the rotating assembly being greatest at the midpart of the roll-over movement and slowing down near the end where it must be stopped.

A further object of the invention is to provide an improved two-way plow of the mentioned character wherein stops at the ends of the roll-over movement are adjustable to provide winging adjustment for the plow without affecting the roll-over mechanism except by limiting the extended length of the double acting ram.

A still further object of the invention is to provide a spinner plow for use in connection with a tractor which is conventionally equipped with a hydraulic pump for operating associated equipment, and wherein none of the hose lines through which pressure fluid is admitted to and emitted from the double acting ram become subject to twisting or bending during roll-over movement of the plow.

A still further object of the invention is to provide an improved spinner plow of the above mentioned character which may readily be adapted for use with tractors having hydraulic pumps of different output capacities, one possibility of effecting such adaptation being to match the ram size to the tractor pump volume so that the roll-over frame will attain sufficient angular velocity to carry it over center but will rotate slowly enough to prevent damage when the frame hits the limit stops.

The foregoing and other objects and advantages are attained by the present invention, various novel features of which will be apparent from the description herein and are pointed out in the appended claims.

Referring to the accompanying drawings:

FIG. 1 is an elevational side view of the rear part of a tractor and of an attached spinner plow, the near rear wheel of the tractor being omitted to expose the hitch connection between the tractor and plow;

FIG. 2 is a partial front view, on an enlarged scale, of the plow shown in FIG. 1, the forward part of the support for the plow being broken away and parts being shown in section on line II—II of FIG. 1;

FIG. 3 is an enlarged top view of parts shown in FIG. 2, the view of FIG. 3 being taken on line III—III of FIG. 2;

FIG. 4 is a sectional view on line IV—IV of FIG. 3;

FIG. 5 is another enlarged partial front view of the plow shown in FIG. 1, the view of FIG. 5 showing part of the support for the plow the same as FIG. 2, and the frame and plow bottom assembly being turned to a center position midway of its right and left-hand plowing positions;

FIG. 6 is another enlarged partial front view of the plow shown in FIG. 1, the view of FIG. 6 showing part of the support for the plow the same as FIG. 2, and the frame and plow bottom assembly being turned through a complete roll-over movement from the plowing position illustrated by FIG. 2;

FIG. 7 is a sectional view on line VII—VII of FIG. 1;

FIG. 8 is a partial top view of FIG. 1 showing a forward portion of the plow frame and associated parts but omitting plow bottoms and coulters shown in FIG. 1;

FIGS. 11 through 15 are schematic views illustrating consecutive stages of a roll-over movement of the plow shown in FIG. 1.

Figure 9:
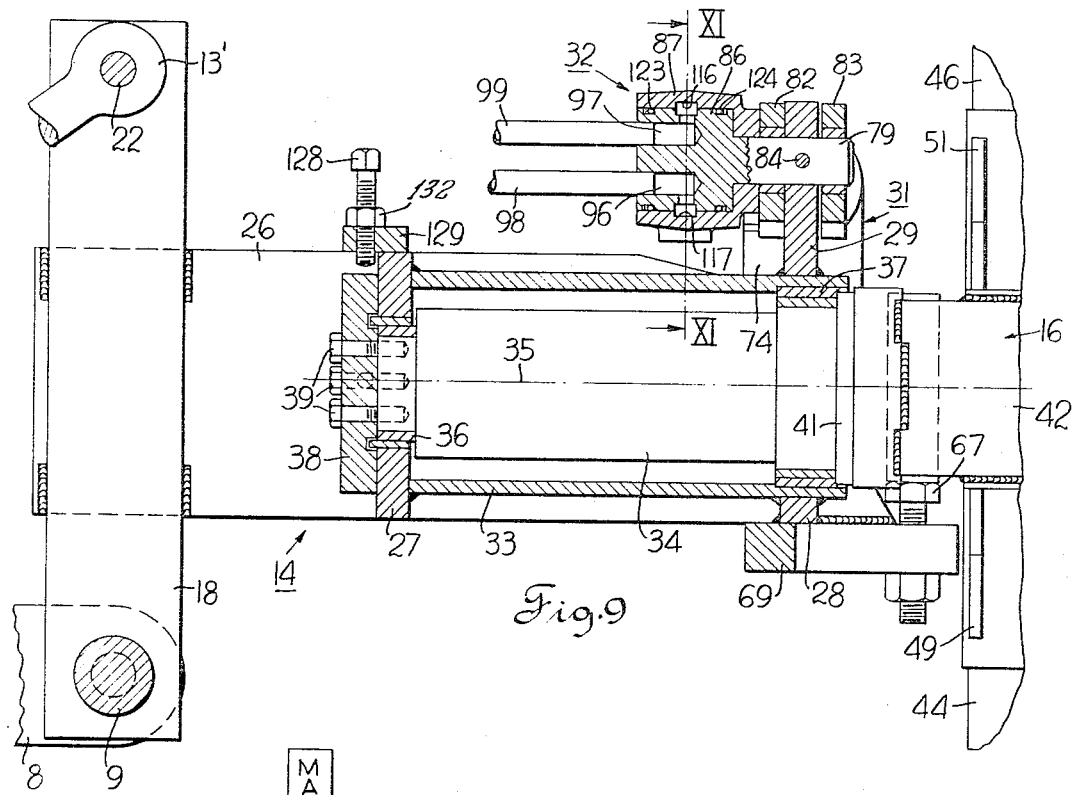
FIG. 9 is a section on line IX—IX of FIG. 8.

The spinner plow shown in FIG. 1 is connected to a conventionally constructed tractor by means of a three point hitch, one of the hitch points being afforded by a draft hook 1 on the tractor, and the other two hitch points being afforded by a pair of transversely spaced power lift arms in conformity with well known principles of construction and operation. One of the power lift arms is designated in FIG. 1 by the reference character 2 and extends rearwardly from a transverse rock shaft 3 on the tractor. The other power lift arm, not shown, extends rearwardly from the rock shaft 3 in the same direction as the power lift arm 2.

A hitch yoke, generally designated by the reference character 4, is of conventional wishbone construction and presents a coupling eye 6 in cooperative engagement with the draft hook 1, and rearwardly diverging draft arms 7 and 8 shown in FIG. 8. A cross shaft 9 (FIG. 1) is nonrotatably secured to the draft arms 7 and 8 of the hitch yoke 4, and the shaft 9 is connected at its opposite ends in lift force transmitting relation with the tractor power lift arms by conventional lift links one of which is designated by the reference character 11 in FIG. 1.

Tiltably mounted on the hitch yoke 4 by means of a cross shaft 12 (FIG. 7) and a turnbuckle 13 (FIG. 1) is a support 14 which serves as a mounting base for the roll-over frame 16 of the spinner plow. The support 14 comprises a pair of upright transversely spaced side plates 17 and 18 which are rigidly secured at their lower ends, as by welding, to axially spaced portions of the cross shaft 12. The upper parts of the side plates 17 and 18 are bent to converge upwardly toward each other and to present parallel upper end portions at a relatively short transverse spacing from each other. The draft arms 7 and 8 of the hitch yoke 4 are pivoted on opposite end journals 19 and 21, respectively, of the cross shaft 12. The turnbuckle 13 has an upper eye 13′ (FIG. 8) between the parallel upper end portions of the side plates 17, 18 and a bolt 22 pivotally connects the eye 13′ with the side plates 17, 18. The lower end of the turnbuckle 13 is pivotally connected to radial ears of the cross shaft 9 by a bolt 23 (FIG. 1). The turnbuckle 13 provides for beaming adjustment of the plow in accordance with well known principles.

A pair of angle irons 24 and 26 (FIGS. 1 and 7) extend horizontally across the outer sides of the upright side plates 17 and 18, respectively, of the support 14. The side plate 17 and the forward end of the angle iron 24 are rigidly secured together, as by welding (FIG. 8), so that one flange of the angle iron lies vertically flat against the outer surface of the side plate 17, and so that the other flange of the angle iron extends laterally outward from the bottom end of the vertical flange. The angle iron 26 is similarly secured to the upright side plate 18 in a position which places the outwardly extending bottom flange of the angle arm 26 in the same horizontal plane as the outwardly extending bottom flange of the angle iron 24. The vertical flanges of the angle irons 24 and 26 are secured together in rear of the side plates 17, 18 by a forward, square bearing plate 27 and by a rearward bracket plate 28.

The bearing plate 27 is connected, as by welding, along its opposite vertical edges to the adjacent vertical flanges of the angle irons 24, 26. The rearward bracket plate 28 extends parallel to the forward bearing plate 27 and is connected, as by welding, along opposite vertical edge portions thereof to adjacent vertical rear edges of the angle irons 24 and 26. The bottom edge of the bracket plate 28 is flush with the undersides of the horizontal flanges of the angle irons 24, 26. The upper part of the bracket plate 28 is extended to present a central, upwardly projecting mounting lug 29 for a double acting hydraulic ram 31 and for an associated control valve 32, as will be more fully explained hereinbelow.

As best shown in FIG. 9, a horizontal tube 33 extends rearwardly from the bearing plate 27 and through a circular hole in the bracket plate 28 midway between the angle irons 24 and 26. The forward end of the tube 33 is secured, as by welding, to the rear face of the bearing plate, and the rear part of the tube 33 is circumferentially secured, as by welding, to the bracket plate 28. The bearing plate 27 has a circular aperture coaxial with the tube 33, and a spindle 34 is rotatably supported in the bearing plate 27 by a sleeve bearing 36, and in the rear part of the tube 33 by another sleeve bearing 37.

The dash-dotted line 35 in FIGS. 1 and 9 indicates the turning axis on which the spindle 34 is rotatable relative to the support 14 and about which the plow frame and associated plow bottoms roll over when the working position of the plow is changed from right to left-hand plowing, and vice versa, as will be explained more fully hereinbelow.

A thrust washer 38 is secured by bolts 39 to the forward end of the spindle 34 and bears rearwardly against the front face of the bearing plate 27 to take up axial rearward thrust which is transmitted to the spindle 34 during plowing. Forward axial displacement of the spindle 34 relative to the support 14 is limited by a shoulder 41 of the spindle which abuts a stationary sleeve of the bearing 37.

The plow frame 16 comprises a central longitudinal member 42, preferably of square tubing, which is rigidly connected to the rear end of the spindle 34 and extends rearwardly therefrom and in axial alignment therewith. Referring to FIGS. 2, 5 and 8, a side arm 43 extends transversely of the frame member 42 at the forward end of the latter and generally in a radial plane through the axis of the spindle 34. The side arm 43 is secured at its radially inner end to the frame tube 42 by welding. Mounting standards 44 and 46 for a right-hand plow bottom 47 and for a left-hand plow bottom 48, respectively, are secured to a portion of the side arm 42 intermediate its inner and outer ends by means of attaching brackets 49 and 51, respectively.

Another pair of right and left-hand plow bottoms 52 and 53 are secured to a portion of the frame tube 42 about midway between its front and rear ends by means of a mounting standard 54.

A rear side arm 56 (FIGS. 2 and 5) extends transversely of the frame tube 42 adjacent the rear end of the latter and radially of the frame tube 42 in generally the same plane as the front side arm 43 but in the opposite direction. A third pair of right and left-hand plow bottoms 57 and 58 are secured to the outer end of the rear side arm 56 by means of a mounting standard 59 and an attaching bracket 61 (FIGS. 2 and 5). Conventionally associated with each right and left-hand plow bottom is a coulter 62. A land wheel 63 is offset stubbleward behind the rear plow bottoms 57 and 58. An adjusting mechanism generally designated by the reference character 64 and fully disclosed in U.S. Patent 3,106,252, granted on October 8, 1963, to J. W. Mydels et al., supportingly connects the gauge wheel 63 with the rear side arm 56, the mechanism 64 being automatically operative to swing the gauge wheel from one operative position to another upon roll-over movement of the plow frame 16 about the axis of the spindle 34.

FIGS. 1 and 2 show the plow frame 16 rotated relative to the support 14 into a first predetermined position for right-hand plowing, and FIG. 6 shows the plow frame 16 rotated relative to the support 14 into a second predetermined position for left-hand plowing. The FIG. 2 position is determined by abutment of an arcuate lug 66 on the forward side arm 43 with a cap screw 67 on the support 14; and the FIG. 6 position is determined by abutment of the arcuate lug 66 with a cap screw 68 on the support 14. The cap screws 67 and 68 are mounted on a horizontally bowed cross bar 69 (FIG. 8) which is secured to the bottom edge of the bracket plate 28 and whose diverging ends project rearwardly beyond the angle irons 24 and 26 and are connected thereto by braces 71 and 72. The cap screw 67 is threaded into a tapped hole in one end of the bar 69 and locked in adjusted position by a jam nut 73, and the cap screw 68 is similarly mounted at the other end of the cross bar 69.

Roll-over movement of the plow frame 16 about the turning axis 35 from the FIG. 2 position into the FIG. 6 position is effected by consecutive contracting and expanding strokes of the double acting hydraulic ram 31. Likewise, return roll-over movement from the FIG. 6 to the FIG. 2 position is effected by consecutive contracting and expanding strokes of the double acting hydraulic ram 31.

The ram 31 comprises telescopically movable cylinder and piston rod elements 74 and 76, respectively, and a piston 77 which is connected to the piston rod 76 within the cylinder. Pivot means for connecting the piston rod 76 with the plow frame 16, and the cylinder 74 with the support 14 at predetermined radial distances from the turning axis 35 comprises a pivot pin 78 at the outer end of the side arm 43, and a stud 79 (FIG. 9) mounted in the lug 29 of the bracket plate 28. As shown in FIG. 8, the piston rod 76 has a bifurcated end which straddles the web of a channel shaped bracket 81. The bracket 81 projects forwardly from the side arm 43, and the pivot pin 78 extends through aligned holes of the bifurcated rod end and the bracket web. The ram cylinder 74 has a pair of mounting prongs 82, 83 at its closed end which straddle the lug 29, and the stud 79 extends through aligned holes of the prongs 82, 83 and lug 29 and is secured within the lug by a cross pin 84 (FIG. 9).

The pivot pin 78 has a center spacing from the turning axis 35 substantially greater than the center spacing of the stud 79 from the turning axis 35. From FIG. 5 it will also be noted that the pivot pin 78 is positioned in a plane which extends through the turning axis 35 substantially midway between the diametrically opposed right and left-hand plow bottoms 52, 53. The stud 79 (FIG. 9) which pivotally connects the ram cylinder 74 with the support 14 is mounted on the latter in vertically overlying relation to the turning axis 35.

Figure 10:
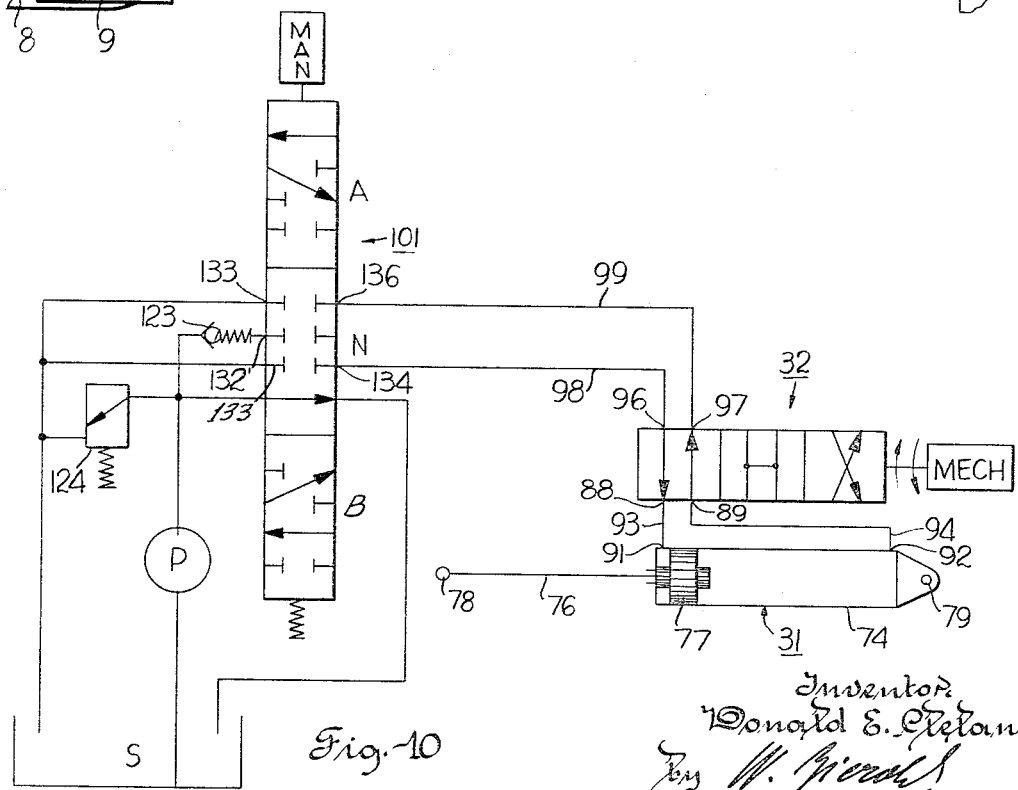
FIG. 10 is a circuit diagram of a hydraulic system incorporating an actuating ram for a roll-over mechanism according to the invention.

Fluid distributing means for effecting consecutive telescopic movements of the ram cylinder 74 and piston rod 76 in opposite directions and thereby roll-over movement of the plow, include the control valve 32 (FIG. 9) at the pivoted end of the ram cylinder 74, and other components schematically shown in the circuit diagram of FIG. 10.

The control valve 32 is a rotary type flow reversing valve, a comprises a stationary inner part 86 which is integral with the pivot stud 79, and a rotary outer part 87 in coaxial, cooperative relation with the inner part 86. The outer valve part 87, as shown in FIG. 2, has first and second fluid ports 88 and 89, and the ram cylinder 74 has fluid ports 91 and 92 which are connected, respectively, with the valve ports 88 and 89 by hose lines 93 and 94. The inner valve part 86 (FIG. 9) has third and fourth axial fluid ports 96 and 97 from which hose lines 98 and 99, respectively, lead to an auxiliary valve 101 schematically shown in FIG. 10 and forming part of a conventional hydraulic power supply system of the tractor.

The auxiliary valve 101 is shown in FIG. 10 in a neutral position designated by the reference character N, in which it diverts pressure fluid from a pump P to a sump S, and in which those hose lines 98 and 99 are blocked. The flow reversing valve 32 is shown in FIG. 10 in the position to which it is adjusted when the plow frame 16 is in the right-hand plowing position illustrated by FIG. 2. From FIGS. 3 and 4 it will be noted that the cylinder prong 82 has a rib 102 and that a hub collar 103 of the outer valve part 87 has a flat face 104 in contact with the rib 102. Pivotal movement of the ram cylinder 74 relative to the support 14 about the stud 79 will therefore be transmitted to the outer valve part 87 while the inner valve part 86 remains in its fixed position relative to the support.

In FIGS. 11 through 15 the fixed angular relationship between the ram cylinder 74 and the outer valve part 87 is symbolically indicated by showing the valve part 87 in the same position relative to the cylinder 74 in each figure. However, the inner valve part 86 which in the illustrated embodiment of the invention is coaxial with the pivot stud 79, has been moved in FIGS. 11 through 15 to one side of the pivot stud 79 in order to illustrate more clearly the relative rotary displacement between the inner and outer valve parts 86 and 87 during a roll-over movement of the plow from the FIG. 2 position to the FIG. 6 position.

In each of FIGS. 11 through 15 the valve 32 is shown on an enlarged scale in section along line XI—XI of FIG. 9. The inner valve part 86 has a generally cylindrical outer surface in rotary engagement with a surrounding cylindrical inner surface of the outer valve part 87. Diametrically opposite portions of the inner valve part are milled out to form an upper recess 106 and a lower recess 107. The upper recess 106 presents a flat surface which terminates at spaced cutoff edges 108 and 109. A radial passage 111 connects the recess 106 with the axial port 97. The lower recess 107 presents a flat surface which terminates at spaced cutoff edges 112 and 113; and a radial passage 114 connects the recess 107 with the axial port 96.

The outer valve part 87 has internal arcuate grooves 116 and 117 which in the adjusted condition of the valve as shown in FIG. 11 register with the recesses 106 and 107, respectively, of the inner valve part 86. The arcuate groove 116 communicates with the outer valve port 89 and terminates at cutoff edges 118 and 119 which are circumferentially spaced from each other a greater distance than the cutoff edges 108 and 109 of the recess 106. Similarly, the arcuate groove 117 communicates with the outer valve port 88 and terminates at cutoff edges 121 and 122 which are circumferentially spaced from each other a greater distance than the cutoff edges 112 and 113 of the recess 107.

As shown in FIG. 9, O-ring seals 123 and 124 are operatively interposed between the inner and outer valve parts 86 and 87 at axially opposite sides of the arcuate recesses 116 and 117.

In the condition of the plow as illustrated by FIG. 2, and of the valves 32 and 101 as illustrated by FIG. 10, the ram 31 is locked against contracting and expanding movement by the valve 101, and consequently the plow frame 16 and associated plow bottoms are maintained in the predetermined, rotatatively adjusted position for right-hand plowing.

Preparatory to roll-over movement of the plow from the FIG. 2 to the FIG. 6 position, the plow will be swung out of the ground in the usual manner by operation of the tractor power lift mechanism, so that there will be no drag of either the plow bottoms or the land wheel 63 during the roll-over movement.

After the plow has been raised, the valve 101 in FIG. 10 may be adjusted manually from its neutral position N to the shifted position indicated by the reference character A. This connects the pump P via a check valve 123 with the hose line 98, and the hose line 99 is vented to sump. Pressure fluid delivered by pump P passes through hose line 98, and as indicated by strippling in FIG. 11, through fluid port 96, radial passage 114, recess 107, arcuate passage 117, and fluid port 88; and then through hose line 93 and cylinder port 91 to the side of ram piston 77 which faces the outer end of the cylinder 74. As a result, the ram 31 begins to contract and causes rotation of the plow frame and associated plow bottoms about the turning axis 35 in clockwise direction as viewed in FIG. 2. The venting of hose line 99 by valve 101 provides for return flow of fluid from cylinder port 92 through hose line 94, valve port 89, arcuate groove 116, recess 106, radial passage 111 and fluid port 97.

FIG. 12 illustrates a rotatively adjusted condition of the valve 32 which is established by partial roll-over movement of the plow from the starting position which is indicated in FIG. 12 by the dotted pin 78. In FIG. 12, the ram 31 has nearly completed its contracting stroke, and the resulting rotation of the outer valve part has moved the cutoff edges 118 and 119 of the outer valve part close to the cutoff edges 109, 113, respectively, of the inner valve part. However, communication still exists between the valve port 89 and the vented valve port 97. Similarly, the cutoff edges 121 and 122 of the outer valve part have moved close to the cutoff edges 108 and 112, respectively, of the inner valve part, but communication still exists between the pressurized valve port 96 and the port 88, as indicated by strippling in FIG. 12. In the FIG. 12 position of the parts the ram 31 exerts the same contracting force between the pin 78 and stud 79 as in the FIG. 11 position of the parts. However, the tangential component of said force which causes the plow to rotate about the turning axis 35 is a maximum in the FIG. 11 position of the parts, and it continuously decreases as the ram swings clockwise toward the position in which it is shown in FIG. 12.

FIG. 13 illustrates a pivotally adjusted mid-position of the ram 31 corresponding to the showing of FIG. 5, and it also shows the position to which the outer valve part 87 is rotated relative to the inner valve part 86 by pivoting of the ram about the stud 79 to the vertical position in which it is shown in FIGS. 5 and 13. Clockwise rotation of the ram 31 through a quarter turn from the starting position which is indicated in FIG. 13 by the dotted pivot pin 78, and a corresponding quarter turn of the outer valve part, places the cutoff edges 118, 119 of the arcuate groove 116 over the cutoff edges 109, 113, respectively, of the recesses 106 and 107. Similarly, the cutoff edges 121 and 122 of the arcuate groove 117 are placed over the cutoff edges 108 and 112, respectively, of the recesses 106 and 107. Under these conditions, the arcuate groove 116 is no longer effectively sealed from the pressurized fluid port 96, and the arcuate groove 117 is no longer effectively sealed from the vented port 97. Accordingly, the ram 31 will exert neither an appreciable outward thrust nor an appreciable inward pull upon the pivot pin 78 of the plow frame when the latter has moved to the midposition in which it is shown in FIG. 5.

FIG. 14 illustrates a pivotally adjusted position of the ram 31 to which it will be swung by the momentum of the plow during clockwise roll-over movement from the starting position indicated by the dotted pin 78 in FIG. 14. Swinging movement of the ram 31 to the position shown in FIG. 14 and corresponding rotary movement of the outer valve part 87 relative to the inner valve part 86 places the arcuate groove 116 in communication with the pressurized valve port 96, and it also places the arcuate groove 117 in communication with the vented valve port 97. As a result, the ram 31 will now be expanded by pressure fluid passing from port 96 through radial passage 114, recess 107, groove 116, port 89, and hose line 94 to the side of ram piston 77 which faces the closed end of the cylinder 74. At the same time, fluid will be discharged from the other side of the piston through hose line 93, port 88, arcuate groove 117, recess 106, radial passage 111, port 97 and hose line 99.

FIG. 15 illustrates the completed expanding stroke of the ram 31 which places the plow frame and associated plow bottoms in the predetermined position for left-hand plowing which is shown in FIG. 6. As the ram 31 swings about the stud 79 from the FIG. 14 position to the FIG. 15 position, and the outer valve part 87 is correspondingly rotated about the inner valve part 86, the pressurized valve port 96 remains in communication with the port 89 through the arcuate groove 116, and the vented valve port 97 remains in communication with the port 88 through the arcuate groove 117. In order to protect the hydraulic system from excessive pressure upon completion of the expanding stroke of the ram 31, a relief valve 124 is connected with the pressure side of the pump P as shown in FIG. 10.

After a roll-over movement of the plow from the FIG. 2 position to the FIG. 6 position has been completed in the hereinbefore described manner by consecutive contracting and expanding strokes of the double acting ram 31, the auxiliary valve 101 may be returned from the operative position A to the neutral position N. The pump P will then discharge directly into the sump S and the piston 77 will be hydraulically locked in the cylinder 74.

In order to return the plow from the left-hand plowing position illustrated by FIGS. 6 and 15 to the right-hand plowing position illustrated by FIGS. 2 and 11, the auxiliary valve 101 in FIG. 10 is adjusted from the neutral position N to the operative position which is indicated by the reference character B. In the B position of the valve 101 pressure fluid from the pump P passes through the check valve 123 and the line 99 into the valve port 97, and fluid from the valve port 96 may return to sump through valve port 96 and the line 98. The ram 31 and valve 32 will then successively move from the FIG. 15 condition through the FIG. 14, FIG. 13 and FIG. 12 conditions into the FIG. 11 condition, whereupon the auxiliary valve 101 may be returned from the B- position to the N- position and the plow be lowered by the tractor power lift mechanism.

For transport purposes, it is desirable that the plow can be locked mechanically in the balanced midposition in which it is shown in FIG. 5. This may be accomplished by means of a cap screw 128 which is mounted on the support 14 (FIG. 2) in overlying relation to the thrust washer 38. The cap screw 128 is threaded into a tapped hole in a block 129 which is welded to the top of the bearing plate 27 (FIG. 9) in forwardly overhanging relation thereto. The thrust washer 38 has a radial bore 131 (FIG. 5) which registers with the lower end of the cap screw 128 when the plow is turned to its midposition. Downward adjustment of the cap screw 128 into the bore 131 locks the plow frame against turning in either direction from its midposition about the axis 35. A jam nut 132 on the cap screw 128 may be drawn up against the block 129 to secure the screw in its upwardly and downwardly adjusted positions.

The auxiliary valve 101 is normally mounted on the tractor and of conventional construction. It includes fluid inlet and outlet ports which are adapted for connection with the pump P and sump S, respectively, and which are indicated in FIG. 10 by the reference characters 132 and 133. Further, the auxiliary valve 101 includes secondary fluid ports 134 and 136 which are connected, respectively, with the third fluid port 96 and the fourth fluid port 97 of the flow reversing valve 32 by the hose lines 98 and 99.

Admission of pressure fluid into the ram 31 through the hose 93 while the plow is in the FIG. 2 position produces a strong force to start turning of the plow about the axis 35 in clockwise direction. As the plow turns it gathers angular velocity which reaches a maximum when the plow moves into the midposition shown by FIG. 5. As the plow continues to roll over from the midposition during the expanding stroke of the ram the angular velocity of the plow decreases and the impact of the arcuate lug 66 upon the stop screw 68 will be correspondingly moderate.

In order to wing the plow in accordance with any selected furrow depth, the cap screws 67 and 68 may be adjusted up or down on the cross bar 69. This will not affect the roll-over mechanism except by limiting the extended length of the ram 31.

As the ram swings back and forth about the pivot stud 79 none of the hose lines 93, 94 and 98 and 99 become subject to bending or twisting.

The separable connection between the ram cylinder 74 and the valve 32 as shown in FIGS. 3, 4 and 9 facilitates installation of differently proportioned rams for purposes of matching the power requirements of the ram to the capacity of the hydraulic power supply system of the tractor which is used to operate the plow.

While in the foregoing a preferred embodiment of the invention has been disclosed, it should be understood that it is not intended to limit the invention to the details of construction herein shown and described, and that the invention includes such other forms and modifications as are embraced by the scope of the appended claims.

Having now particularly described and ascertained the nature of my said invention and the manner in which it is to be performed, I declare that what I claim is:

1. In a two-way plow of the type wherein a support and a roll-over frame mounting right and left-hand plow bottoms are rotatably interconnected on a longitudinal turning axis, the combination of a double acting hydraulic ram having piston rod and cylinder elements in telescopically movable relation to each other; pivot means operatively connecting one of said ram elements with said frame and the other with a pivot stud attached to said support at predetermined radial distances, respectively, from said turning axis so that consecutive telescopic movements of said ram elements in opposite directions will rotate said frame in one direction about said turning axis from one predetermined plowing position into another; and a rotary valve for effecting said consecutive movements of said ram elements and comprising a stationary inner part integral with said pivot stud and an outer part attached to said other ram element for movement therewith and being mounted about said inner part in coaxial, cooperative relation thereto.

2. A two-way plow as set forth in claim 1, wherein said pivot means connecting said roll-over frame and one of said ram elements have a center spacing from said turning axis substantially greater than said pivot means which connect said support with the other of said ram elements.

3. A two-way plow as set forth in claim 1, comprising right and left-hand plow bottoms mounted on said roll-over frame in generally diametrically opposed relation to each other; and wherein said pivot means operatively connecting said one ram element with said roll-over frame are in a plane extending through said turning axis substantially midway between said plow bottoms.

4. A two-way plow as set forth in claim 3, wherein said pivot means which connect said support with said other ram element are mounted on said support in vertically overlying relation to said turning axis.

5. A two-way plow as set forth in claim 3, wherein said piston rod element of said double acting ram is pivotally connected with said roll-over frame, and wherein said cylinder element of said double acting ram is pivotally connected with said pivot stud on a center in overlying relation to said turning axis.

6. In a two-way plow of the type wherein a support and a roll-over frame mounting right and left-hand plow bottoms are rotatably interconnected on a longitudinal turning axis, the combination of a double acting hydraulic ram having piston rod and cylinder elements in telescopically movable relation to each other; pivot means operatively connecting one of said ram elements with said frame and the other with said support at predetermined radial distances, respectively, from said turning axis so that consecutive telescopic movements of said ram elements in opposite directions will rotate said frame in one direction about said turning axis from one predetermined plowing position into another; and fluid distributing means including a rotary valve element secured to said other ram element concentrically with the pivot connection between the latter and said support, for effecting said consecutive telescopic movements of said ram elements.

7. A two-way plow of the type wherein a support and a roll-over frame mounting right and left-hand plow bottoms are rotatably interconnected on a longitudinally turning axis, the combination of a ram cylinder having fluid ports at its opposite ends, a piston reciprocable within said cylinder and connected to a piston rod projecting through one end of the latter; pivot means operatively connecting said piston rod with said frame, and said ram cylinder with said support, at predetermined radial distances, respectively, from said turning axis so that consecutive inward and outward movements of said piston rod relative to said cylinder will rotate said frame in one direction about said turning axis from one predetermined plowing position into another; and fluid distributing means including flow reversing valve means connected in fluid communicating relation with said cylinder ports and in motion transmitting relation with said cylinder for effecting said consecutive inward and outward movements of said piston rod, said flow reversing valve means comprising a pair of coaxial, relatively rotatable valve elements, one within the other; conduit means connecting said cylinder ports with first and second fluid ports, respectively, of said outer valve element, and means mounting said inner and outer valve elements on said support and ram cylinder, respectively, in concentric relation with said pivot means which connect said ram cylinder with said support; said inner valve element having a third and a fourth fluid port and being cooperable with said outer valve element so as to either connect said first with said third, and said second with said fourth fluid port, or to connect said first with said fourth and said second with said third fluid port.

8. A two-way plow as set forth in claim 7, and further comprising auxiliary valve means having fluid inlet and outlet ports adapted for connection with a source of fluid pressure and a sump, respectively; said auxiliary valve means having secondary fluid ports connected, respectively, with said third and fourth fluid ports of said reversing valve means and being operable to either connect said inlet port with one of said secondary fluid ports, and said outlet port with the other of said secondary fluid ports; or to connect said outlet port with said one and said inlet port with said other secondary fluid port.

References Cited by the Examiner

UNITED STATES PATENTS

| 3,174,556 | 3/1965 | Knapp et al. | 172—225 X |
|---|---|---|---|
| 3,175,624 | 3/1965 | Ward | 172—225 |

FOREIGN PATENTS 1,164,355  5/1958  France.

ABRAHAM G. STONE, *Primary Examiner.*

ANTONIO F. GUIDA, R. L. HOLLISTER,
*Assistant Examiners.*